(12) United States Patent
Morita

(10) Patent No.: US 7,499,230 B2
(45) Date of Patent: Mar. 3, 2009

(54) LENS BARREL, LENS TILT ADJUSTING METHOD AND IMAGING APPARATUS

(75) Inventor: Masayuki Morita, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/727,548

(22) Filed: Mar. 27, 2007

(65) Prior Publication Data

US 2007/0236808 A1 Oct. 11, 2007

(30) Foreign Application Priority Data

Apr. 10, 2006 (JP) ............................ P2006-108091

(51) Int. Cl.
*G02B 7/02* (2006.01)

(52) U.S. Cl. ........................ 359/811; 359/819; 359/822; 359/823

(58) Field of Classification Search .......... 359/694–823
See application file for complete search history.

(56) References Cited

U.S. PATENT DOCUMENTS

| | | | | |
|---|---|---|---|---|
| 5,699,200 | A * | 12/1997 | Uno et al. | 359/700 |
| 7,221,524 | B2 * | 5/2007 | Ye et al. | 359/819 |
| 7,230,777 | B2 * | 6/2007 | Ye | 359/811 |

FOREIGN PATENT DOCUMENTS

| | | |
|---|---|---|
| JP | 61-151466 | 7/1986 |
| JP | 02-016416 | 1/1990 |
| JP | 07-121882 | 5/1995 |
| JP | 2003-043328 | 2/2003 |
| JP | 2003-215420 | 7/2003 |
| JP | 2004-004206 | 1/2004 |
| JP | 2004-163865 | 6/2004 |

OTHER PUBLICATIONS

Japanese Office Action dated May 2, 2008 for corresponding Japanese Application No. 2006-108091.

* cited by examiner

*Primary Examiner*—Mohammed Hasan
(74) *Attorney, Agent, or Firm*—Rader Fishman & Grauer PLLC; Ronald P. Kananen

(57) ABSTRACT

There is provided a lens barrel including a lens barrel body for fixably and/or movably supporting a plurality of lenses, lens holding members for holding one of the plurality of lenses, and an alignment device for aligning the lens holding members such that optical axes approximately agree with an optical axis of one of the lenses. In this lens barrel, the alignment device includes at least three supporting portions such that the attitudes of the lens holding members may be changed, at least one of the three supporting portions includes a spherical convex portion provided on one of the lens holding members and the lens barrel body, and a spherical concave portion provided on the other of the lens holding members and the lens barrel body, and at least one of the remaining supporting portions can adjust a distance between the lens holding members and the lens barrel body.

6 Claims, 6 Drawing Sheets

LENS BARREL, LENS TILT ADJUSTING METHOD AND IMAGING APPARATUS

CROSS REFERENCES TO RELATED APPLICATIONS

The present invention contains subject matter related to Japanese Patent Application JP 2006-108091 filed in the Japanese Patent Office on Apr. 10, 2006, the entire contents of which being incorporated herein by reference.

BACKGROUND OF THE INVENTION

1. Field of the Invention

The present invention relates to a lens barrel for fixably or movably holding a plurality of lenses, a method of adjusting the lenses supported on the lens barrel, and an imaging apparatus including the lens barrel, and relates particularly to a lens barrel, a method of adjusting the tilt of a lens and an imaging apparatus in which the tilt of a lens holding members for holding a lens group may easily be adjusted.

2. Description of the Related Art

In recent years, imaging apparatuses represented by cameras, such as a digital video camera and a digital still camera having a solid-state imaging apparatus, such as a CCD (charge-coupled device) and a CMOS (complementary metal-oxide semiconductor), have increased the number of pixels due to an increased integration of the solid-state imaging apparatus. In addition, an optical system for an imaging apparatus is expected to include higher resolution, a lens barrel with a reduced size, and increased magnification of the zoom ratio.

Accuracy in an optical system and a mechanism system may be necessary for realizing a high resolution of the optical system along with reducing the size of the lens barrel; in particular, accurate lens eccentricity may be increased.

On the other hand, magnification of the zoom ratio may be achieved by increasing the number of operation strokes or increasing the refractivity of a lens group that determines a zoom magnification. However, increasing the number of operation strokes of the lens group contradicts the decrease in the size of the lens barrel, and the lens group may be adjusted more strictly and accurately when increasing the refractivity of the lens group. The eccentricity of the lens is frequently adjusted in an imaging apparatus, such as a digital video camera and a digital still camera. A step of adjusting the eccentricity involves drawbacks from a viewpoint of cost effectiveness and number of steps. Accordingly, it is desirable that the lens eccentricity be easy and simple to adjust in the imaging apparatus.

Further, the imaging apparatus represented by the digital video camera and the digital still camera mostly implies that consumer camera products and their value as camera products may not increase without improving the reliability and safety of camera products. In particular, with regard to the reliability of camera products on the market, various types and applications of a camera may be expected in order to satisfy the requirement for high reliability. Accordingly, the imaging apparatus represented by the digital video camera and the digital still camera may have a configuration capable of maintaining a sufficiently high reliability. If the lens barrel of the imaging apparatus is reduced in size by employing a simple mechanism, some defects may appear on the market after shipping the products. This factor may impose restrictions on the adjustment of the lens eccentricity in view of the mechanism, thereby restricting the reduction in size of the imaging apparatus and increasing the number of steps.

Japanese Unexamined Patent Publication No. 2003-43328 discloses a lens barrel according to the related art and, more particularly, describes a method of adjusting a zoom lens, a method of adjusting an imaging apparatus including the zoom lens and a zoom lens and an imaging apparatus adjusted by these methods. According to Japanese Unexamined Patent Publication No. 2003-43328, the zoom lens described is characterized in that the zoom lens includes a stationary lens group and a movable lens group. The zoom lens includes a movable lens group that moves in an optical axis direction to adjust a focal length and a focus. In the zoom lens, the tilt of the stationary lens group may be adjusted relative to the optical axis such that image formation is measured at four or more measuring points on the formed image, defocusing coordinates with which the best image formation is obtained at the respective measuring points are specified, four or more planes formed by three points of the specified defocusing coordinates are defined, the tilt of the stationary lens group is figured out when having four or more planes matched by adjusting the tilt relative to the optical axis of the stationary lens group, and the calculated tilt of the stationary lens group relative to the optical axis is used as a target point of the adjustment.

According to the zoom lens having the above-mentioned configuration, "a tilt of a lens can easily be adjusted without consuming time and labor for replacement of adjustment parts and without displacing the position of the center of the lens center in the optical axis direction" (paragraph [0104] in the patent specification).

Japanese Unexamined Patent Publication No. 2004-163865 discloses another example of the lens barrel according to the related art and, more specifically, discloses a lens alignment mechanism for aligning a lens when a lens holding member for holding the lens is attached to a lens barrel body, a lens apparatus and an imaging apparatus including such lens alignment mechanism. The lens apparatus described in Japanese Unexamined Patent Publication No. 2004-163865 is characterized in that "the lens apparatus includes a plurality of lenses for focusing a subject image, lens holding members for holding at least one of a plurality of lenses, and a lens barrel body to which the lens holding members are attached. In the lens apparatus are located a plurality of lenses such that the optical axes of the lenses agree with each other, a supporting device for properly positioning the lens holding members relative to the lens barrel body within a plane perpendicular to the optical axis of the above-described lens, supporting the lens holding members such that the lens holding members may move in the optical axis direction, and a plurality of adjusting members rotatably attached to at least three portions of the outer peripheral surface of the lens barrel body, in which tilts of the lenses held by the lens holding members may be adjusted by rotating the respective adjusting members to displace the lens holding members in the optical axis direction.

According to the lens apparatus having the above-mentioned configuration, the lens alignment mechanism may be reduced in size as compared with the size of the related-art lens alignment mechanism, and expansion of the outer form of the lens barrel body may be minimized so that the entire size of the lens apparatus and the imaging apparatus including such lens alignment mechanism may be reduced in size (paragraph [0107] of the patent specification) can be achieved.

However, the zoom lens disclosed in the Japanese Unexamined Patent Publication No. 2003-43328 has encountered the following drawbacks. In a step of adjusting tilt eccentricity (adjustment item in the large magnification) of a first lens group, first, the first lens group is located at a designed target position using a position adjusting mechanism including a pressure spring and a drawing screw for presetting the height and the tilt in the optical axis direction. The target position is determined using a statistical central value computed by the feed-back obtained from a formed image at four measuring points within the focusing plane in the next step, and the target value is changed when the position of a metal mold is modified. As a result, management of the preset step and the measurement step becomes complicated such that more work steps may be required.

In the lens apparatus disclosed in the Japanese Unexamined Patent Publication No. 2003-43328, the lens holding members are elastically supported on the lens barrel body using the supporting devices provided at the three portions and tilts of the lenses held on the lens holding members are adjusted by using the adjusting members provided at the three portions. Specifically, the supporting points of the three portions to support the lens holding members are respectively the movable floating supporting points so that, if the supporting point of one portion is adjusted, such adjustment of one supporting point affects the other supporting points of two portions, thereby causing a reference point (position) to change constantly. Therefore, problems arise in which an adjustment work becomes complex and in which it is difficult to adjust lens tilts to the desired states.

SUMMARY OF THE INVENTION

According to the related-art lens barrel, the number of steps for adjusting the eccentricity of a lens due to a complication in the management of the steps including presetting and measuring may be increased. Moreover, adjustment of a lens tilt may be too complicated to adjust to the desired state in the related-art lens barrel.

According to an embodiment of the present invention, there is provided a lens barrel including a lens barrel body for fixably and/or movably supporting a plurality of lenses, lens holding members for holding at least one of the plurality of lenses, and an alignment device for aligning the lens holding members supported on the lens barrel body such that optical axes of the plurality of lenses approximately agree with an optical axis of at least one of the plurality of lenses. In this lens barrel, the alignment device includes at least three supporting portions to support the lens holding members on the lens barrel body such that the attitudes of the lens holding members may be changed, at least one of the three supporting portions includes a spherical convex portion provided on one of the lens holding members and the lens barrel body, and a spherical concave portion is provided on the other of the lens holding members and the lens barrel body that is engaged with the spherical convex portion, and at least one of the remaining supporting portions of the three except the one supporting portion can adjust a distance between the lens holding members and the lens barrel body.

According to an embodiment of the present invention, there is provided a method of adjusting the tilt of a lens of a lens barrel including the steps of spherically supporting one portion of a lens holding member for holding at least one lens on a lens barrel body that fixably and/or movably supports a plurality of lenses, and supporting two or more portions of the lens holding member except the spherically supported one portion of the lens holding member such that the heights of two or more portions of the lens holding member can be adjusted. In the method of adjusting the tilt of a lens of a lens barrel, the tilt of at least one lens is adjusted corresponding to the plurality of lenses by adjusting the heights of the two or more portions of the height adjustable supporting portions.

According to an embodiment of the present invention, there is provided an imaging apparatus including a lens barrel having a lens barrel body for fixably and/or movably supporting a plurality of lenses, lens holding members for holding at least one of the plurality of lenses, and an alignment device for aligning the lens holding members supported on the lens barrel body such that the optical axes of the plurality of lenses approximately agree with an optical axis of at least one of the plurality of lenses. In the imaging apparatus, the alignment device includes at least three supporting portions to support the lens holding members on the lens barrel body such that the attitudes of the lens holding members may be changed, at least one of the three supporting portions includes a spherical convex portion provided on one of the lens holding members and the lens barrel body and a spherical concave portion provided on the other of the lens holding members and the lens barrel body that is engaged with the spherical convex portion, and at least one of the remaining supporting portions of the three except the one supporting portion can adjust a distance between the lens holding members and the lens barrel body.

In a lens barrel, a method of adjusting a tilt of a lens of a lens barrel, and an imaging apparatus according to embodiments of the present invention, since a tilt of a lens held by the lens holding members may easily be adjusted, a lens barrel having a simple configuration, a method of adjusting a lens tilt suitable for employing the lens barrel, and an imaging apparatus including the lens barrel may be provided.

DESCRIPTION OF THE PREFERRED EMBODIMENTS

The present invention now will be described in detail with reference to the drawings. Before illustrating the detailed description, a summary will be described briefly according to an embodiment of the present invention. Specifically, an alignment device for supporting lens holding members on a lens barrel body includes at least three supporting portion such that the lens holding members may change attitudes. One supporting portions is used as a stationary reference point including a spherical convex portion and a spherical concave portion, and remaining supporting portions are allowed to be movable so that a distance between the lens holding members and the lens barrel body may be adjusted, a lens barrel in which tilts of lenses held on the lens holding members may easily be adjusted, and a method of adjusting a tilt with the lens barrel and an imaging apparatus including such lens barrel can be realized by having simple configurations.

Figure 1:
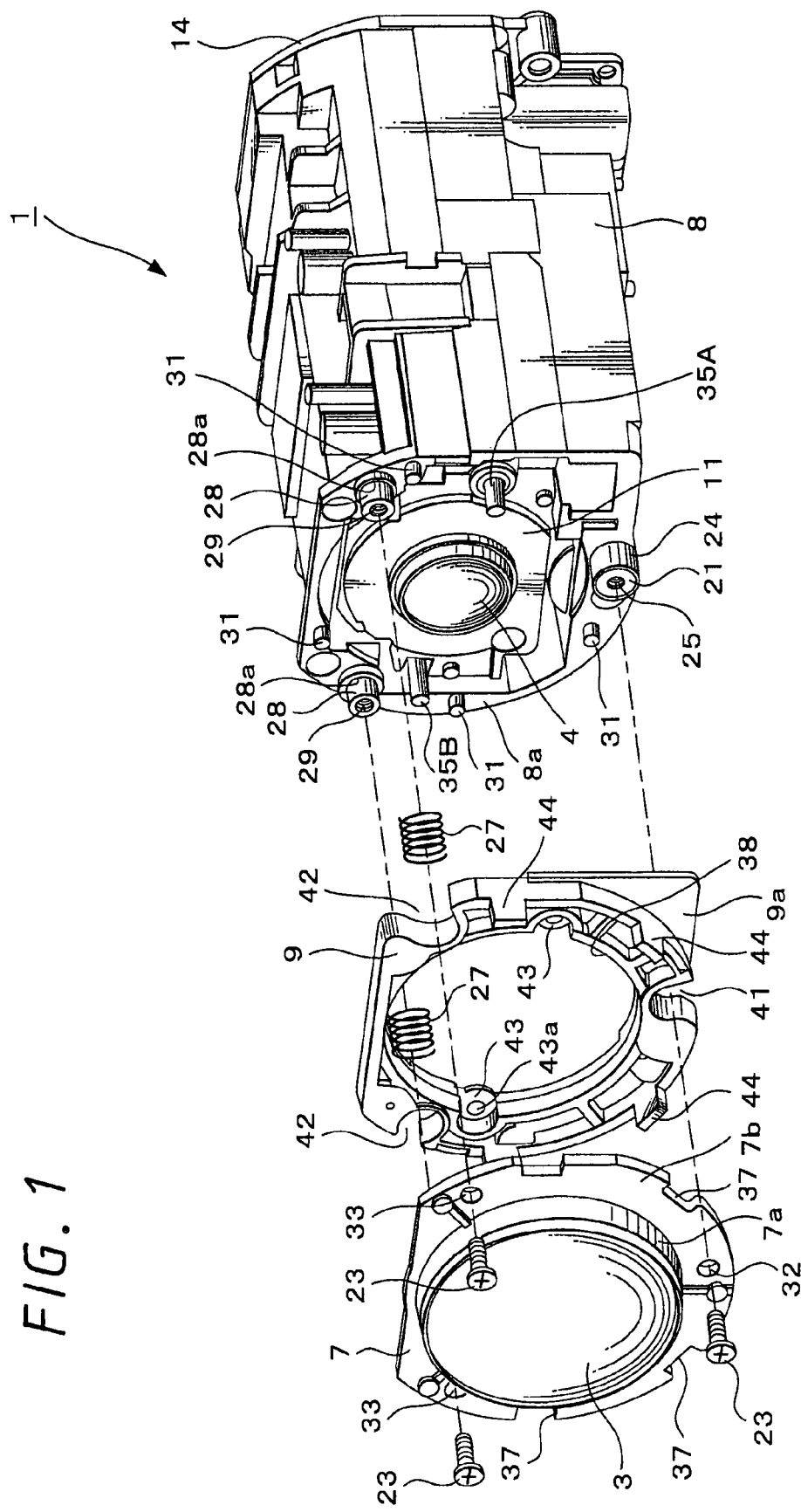
FIG. 1 is an exploded perspective view showing a first embodiment of a lens barrel according to an embodiment of the present invention.
Figure 2:
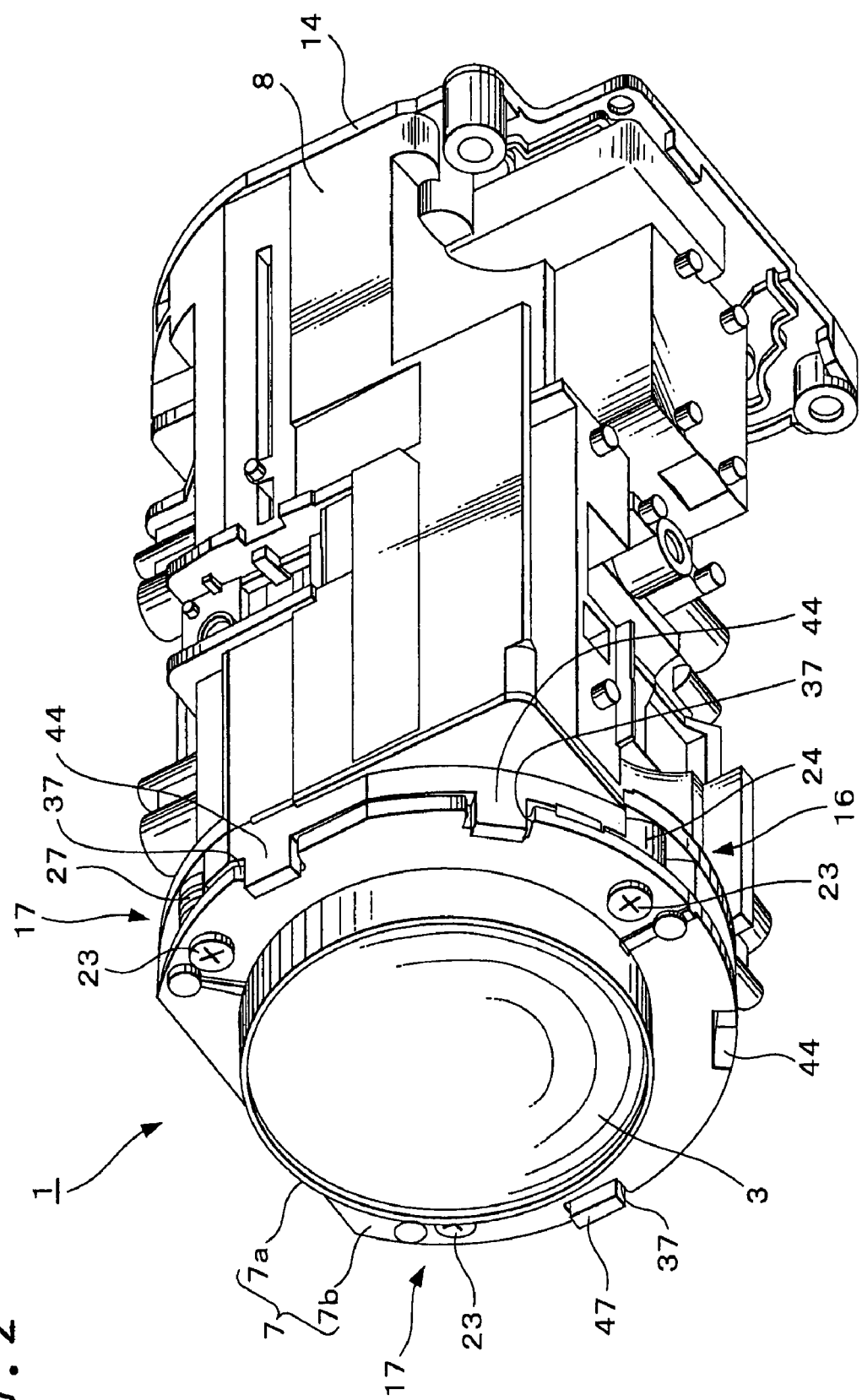
FIG. 2 is a perspective view showing the first embodiment of the lens barrel according to an embodiment of the present invention.
Figure 3:
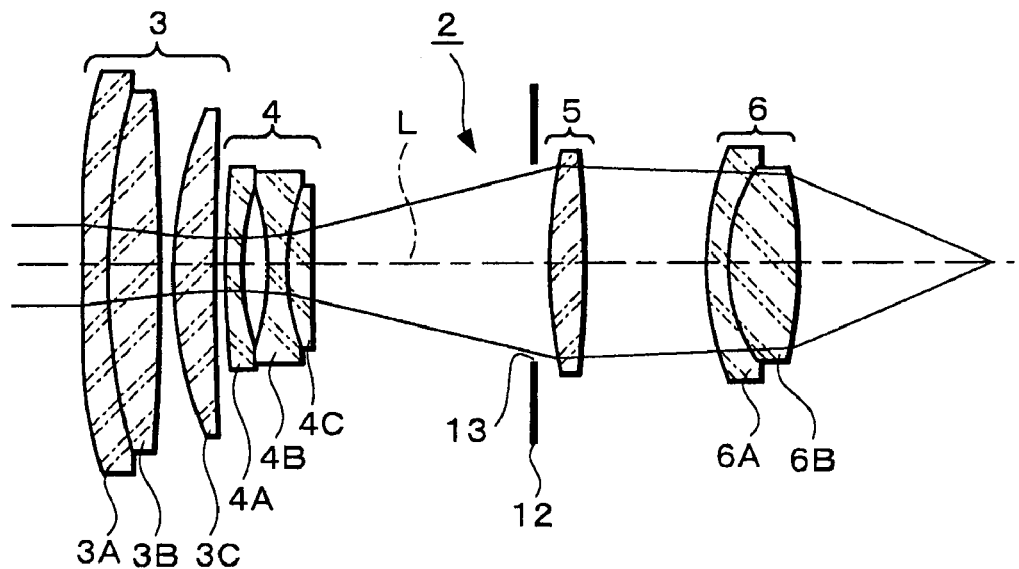
FIG. 3 is an explanatory diagram of a low magnification (wide-angle) state, showing a lens system of the first embodiment of the lens barrel according to an embodiment of the present invention.
Figure 4:
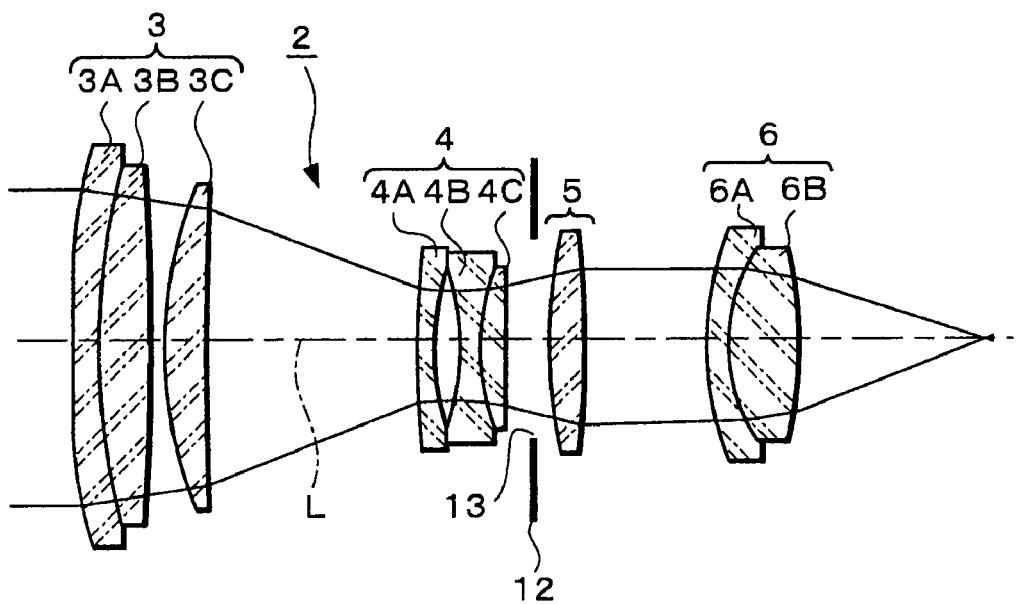
FIG. 4 is an explanatory diagram of a high magnification (telephoto) state, showing a lens system of the first embodiment of the lens barrel according to an embodiment of the present invention.
Figure 5:
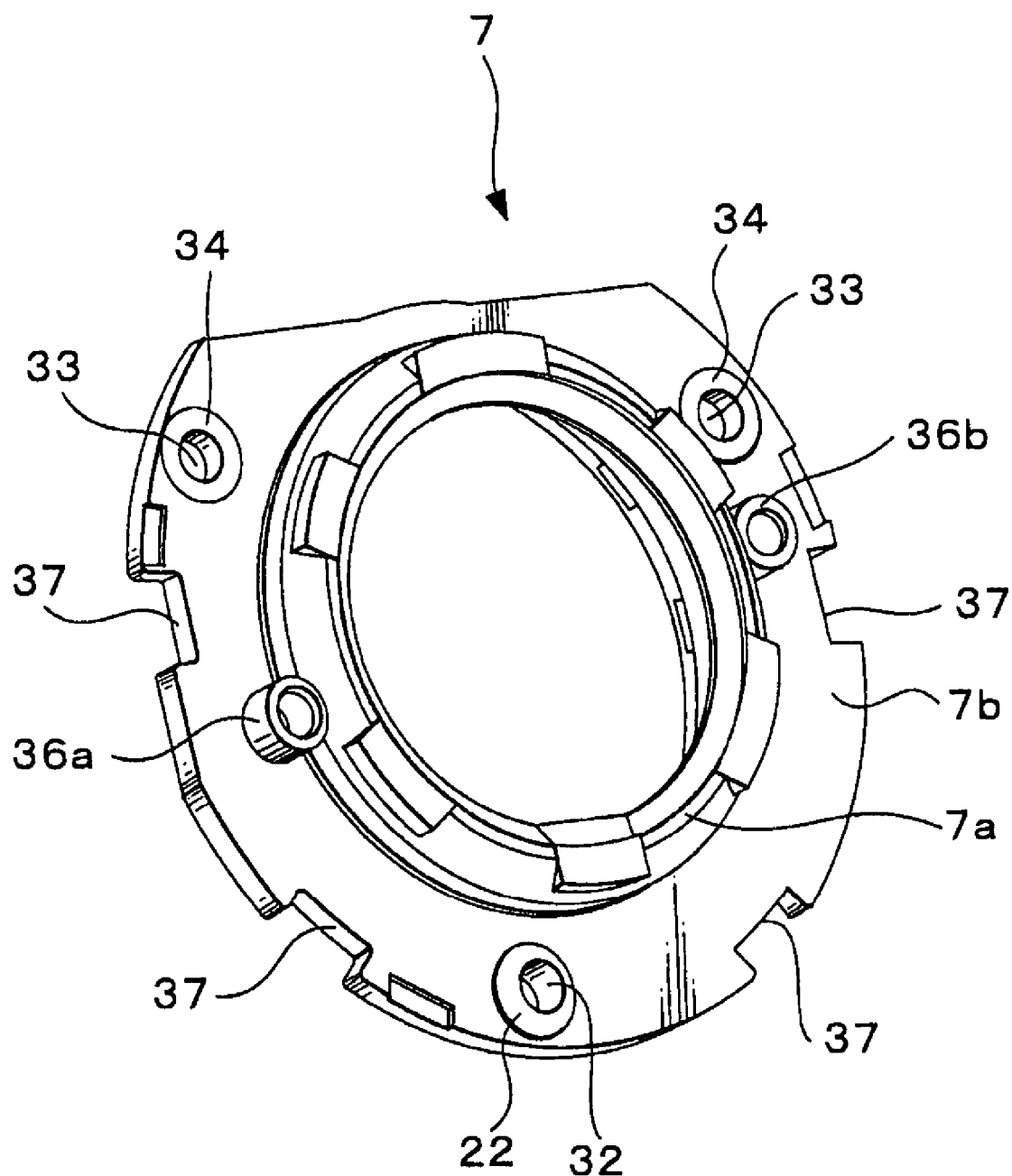
FIG. 5 is a perspective view showing from the back side a first lens frame illustrating a first embodiment of a lens holding member of the lens barrel according to an embodiment of the present invention.
Figure 6:
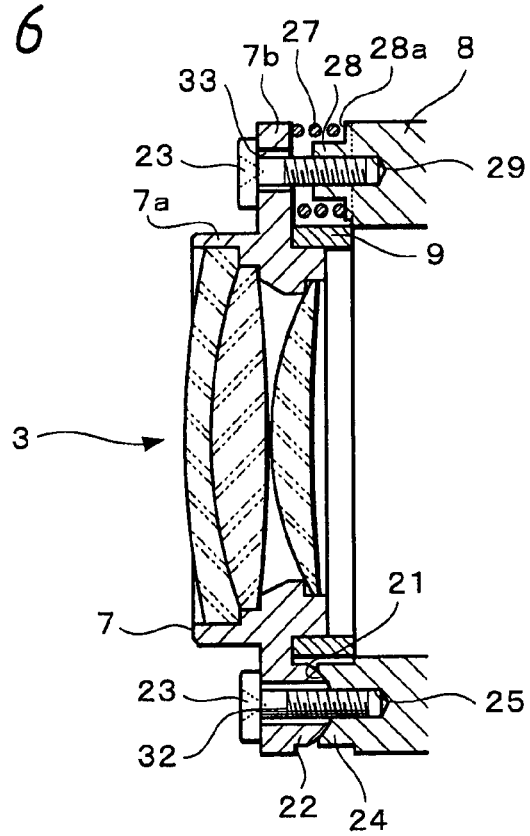
FIG. 6 is an explanatory diagram showing in a cross-sectional fashion a main portion of the first embodiment of the lens barrel according to an embodiment of the present invention.
Figure 7:
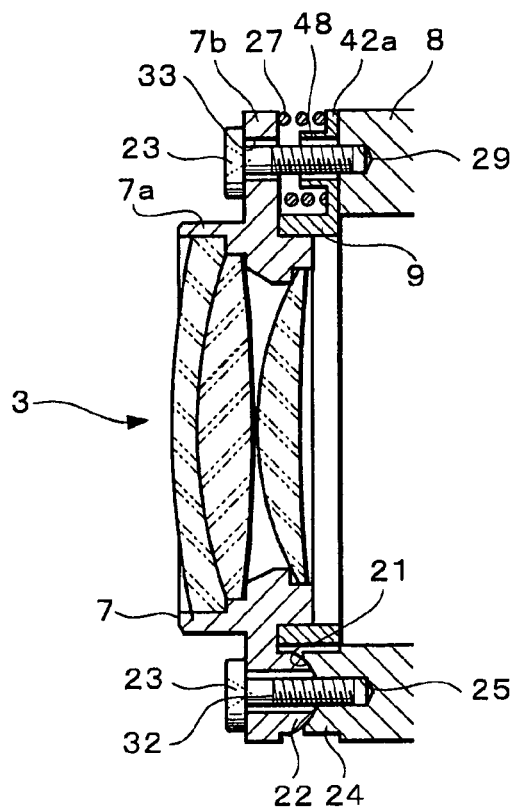
FIG. 7 is an explanatory diagram showing in a cross-sectional fashion a main portion of a second embodiment of a lens barrel according to an embodiment of the present invention.
Figure 8:
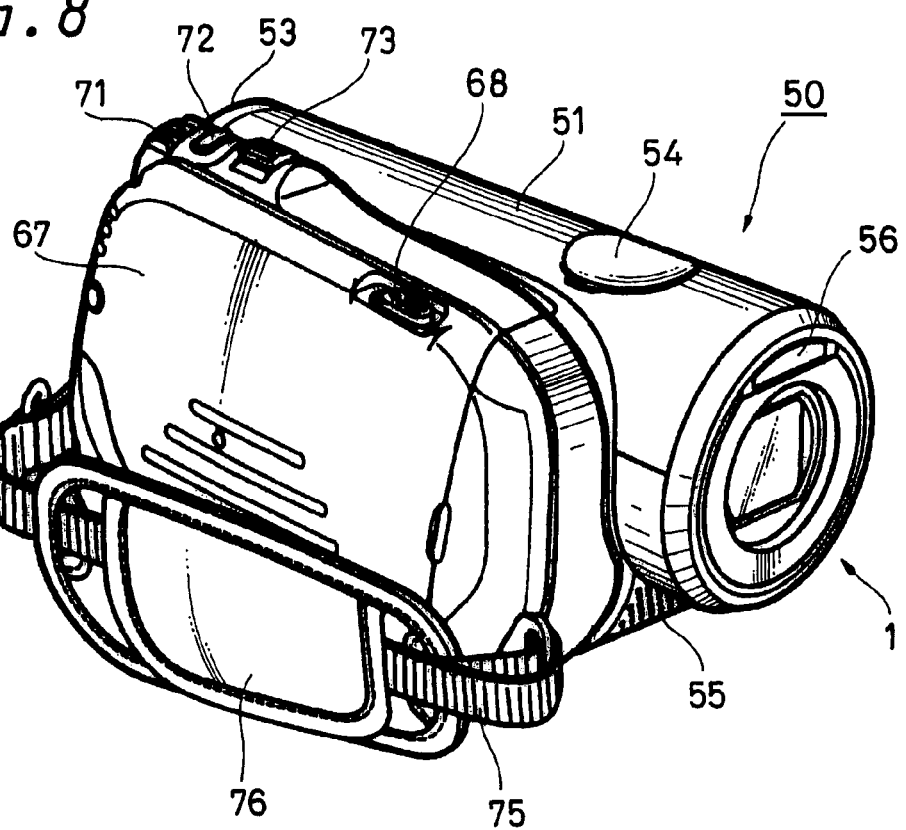
FIG. 8 is a perspective view showing from the front side a digital video camera which shows a first embodiment of an electronic instrument using the lens barrel according to an embodiment of the present invention.
Figure 9:
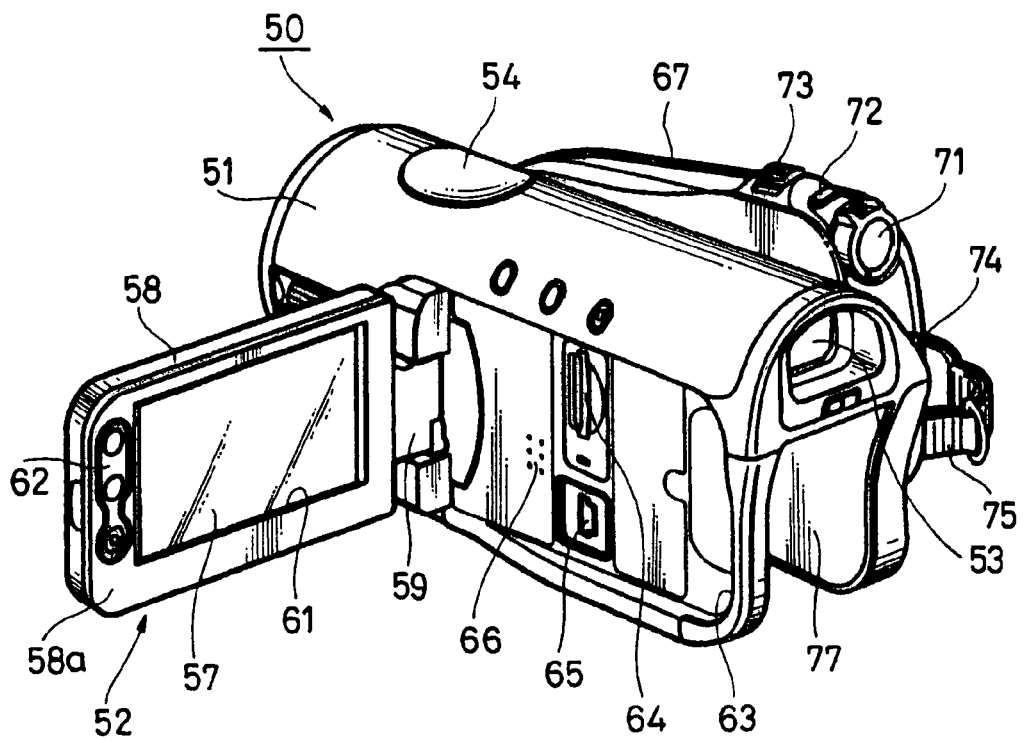
FIG. 9 is a perspective view showing from the back side the digital video camera which shows the first embodiment of the electronic instrument using the lens barrel according to an embodiment of the present invention.

FIGS. 1 to 9 of the accompanying drawings are diagrams showing embodiments of the present invention. More specifically, FIG. 1 is an exploded perspective view showing a first embodiment of a lens barrel according to an embodiment of the present invention. FIG. 2 is an assembly perspective view of a lens barrel. FIGS. 3 and 4 are explanatory diagrams of a lens system. FIG. 5 is a perspective view showing a first embodiment of a lens holding member. FIGS. 6 and 7 show a cross-sectional view of two embodiments of a lens holding member supported to a lens barrel body. FIG. 8 is a front perspective view showing a first embodiment of an imaging apparatus using a lens barrel according to an embodiment of the present invention. FIG. 9 is a rear perspective view showing an imaging apparatus using a display apparatus.

As shown in FIGS. 1 to 4, a lens barrel 1 showing a first embodiment of a lens barrel according to an embodiment of the present invention includes a plurality of lenses on an optical axis L, specifically, a lens system 2 formed as a combination of several types of lenses including four groups of lenses having a range of a first lens group 3 to a fourth lens group 6, a first lens frame 7 showing a specific example of a lens holding member to hold the first lens group 3 of the lens system 2, a lens barrel body 8 for fixably or movably supporting three groups of lenses having a range of the second lens group 4 to the fourth lens group 6, and a front cover 9 showing a specific example of a cover member lying between the lens barrel body 8 and the first lens frame 7.

Of the lens system 2 of the lens apparatus 1, the first lens group 3 located at the tip end located close to a subject is formed of a first lens 3A, which is a objective lens facing the subject, a second lens 3B attached to the face of the first lens 3A located opposite to the subject and a third lens 3C located farther inside of the lens apparatus 1. The first lens group 3 formed of a set of three lenses from the first lens 3A to the third lens 3C is fixably supported on the first lens frame 7, and hence is formed as one lens. The second lens group 4 is located behind the first lens group 3 so that light passed through the first lens group 3 is introduced into the second lens group 4.

The second lens group 4 is a lens group including a fourth lens 4A, a fifth lens 4B and a sixth lens 4C. The second lens group 4 is supported by a second lens frame 11, which may be supported within the lens barrel body 8 so as to move back and forth in a direction of the optical axis L. The second lens frame 11 is formed such that the second lens frame 11 may be moved back and forth in the optical axis direction along the optical axis L using an electric actuator (not shown). Light passing through the second lens group 4 passes an opening portion 13 of an iris shutter apparatus 12 and is introduced into the third lens group 5. The iris shutter apparatus 12 includes an iris mechanism, which may adjust an amount of light passing through the lens system 2, a shutter mechanism for opening and closing a light path and the like.

The third lens group 5 is formed of a seventh lens fixed to the lens barrel body 8. The fourth lens group 6 is located behind the third lens group 5. The fourth lens group 6 is formed of a combination of an eighth lens 6A and a ninth lens 6B. The lens group 6 is held on a rear lens barrel 14 attached to the rear portion of the lens barrel body 8. A solid-state imaging apparatus 7 formed of a suitable device, such as a CCD (charge-coupled device) and a CMOS (complementary metal-oxide semiconductor), is located behind the fourth lens group 6. The solid-state imaging apparatus (not shown) is attached to the rear lens barrel 14 through an adapter such that an approximately central portion of the light-receiving surface of the solid-state imaging apparatus may agree with the optical axis L.

The second lens group 4 may move in the optical axis direction along the optical axis L through the second lens frame 11, and zooming may be adjusted by moving the second lens group 4. More specifically, the second lens frame 11 is held by two guide shafts 35A, 35B located in parallel to the optical axis L. The second lens frame 11 may be moved in the direction of the optical axis L by a moving unit (not shown). When the second lens frame 11 is moved by the moving unit to allow the second lens group 4 to move in the optical axis direction of the optical axis L, zooming may be adjusted smoothly from the wide (wide angle=low magnification) state shown in FIG. 3 to the telephoto (telephoto=high magnification) state shown in FIG. 4.

As shown in FIG. 1, the lens barrel body 8 is formed of a hollow cylindrical case to accommodate the 4-group lenses of the lens system 2 ranged from the second lens group 4 to the fourth lens group 6. The first lens frame 7 is attached to the front surface of the lens barrel body 8 through an alignment device 15 that may change attitudes of the first lens group 3 upon assembly. The alignment device 15 includes at least three supporting portions 16, 17 and 18. The alignment device 15 may include three supporting portions in total provided on at least three positions. Alternatively, the alignment device 15 may include four or more supporting portions in total provided on four or more positions. The three supporting portions 16, 17 and 18 of the alignment device 15 indicate a first supporting portion 16, which is one supporting portion provided at approximately the central portion of the lower portion, and second supporting portions 17, 17, which are remaining portions provided at the left and right of the upper portion.

The first supporting portion 16 of the alignment device 15 is formed of a spherical concave portion 21 provided on the lens barrel body 8, a spherical convex portion 22 provided on the first lens frame 7 that is engaged with the spherical concave portion 21, and an attaching screw 23 that penetrates the spherical concave and convex portions 21 and 22 to have the first lens frame 7 support the lens barrel body 8. The spherical concave portion 21 is formed as a hemispherical concave portion having an adequate radius of curvature on an end face 24 of a shaft-form protrusion 24 provided on a front end face 8a of the lens barrel body 8. Further, the spherical concave portion 21 includes a screw hole 25 formed at the central portion of the spherical concave portion 21 extended in the direction parallel to the optical axis of the lens system 2. A screw shaft portion of the attaching screw 23 inserted into an insertion hole provided in the first lens frame 7 is screwed into the screw hole 25. The shaft-form protrusion 24 having the spherical concave portion 21 is located at a lower portion of the front end face 8a of the lens barrel body 8a.

The two supporting portions 17, 17 of the alignment device 15 include coil springs 27, 27 indicating a specific example of elastic members, supporting protrusions 28, 28 to support the coil springs 27, 27 at predetermined positions, and the attaching screws 23, 23 that penetrate the coil springs 27, 27 to support the first lens frame 7 on the lens barrel body 8. The two supporting protrusions 28, 28 are located on the upper left and right portions of the front end face 8a of the lens barrel body 8 with approximately equal intervals to form a triangle between the two supporting protrusions 28, 28 and the shaft-form protrusion 24. Each supporting protrusion 28 includes a seat 28a on which one end of each coil spring 27 is seated. A screw hole 29 is formed in the end face of each supporting protrusion 28 into which a screw shaft portion of the attaching screw 23 is screwed. Further, a plurality of locating pins 31 (four locating pins 31 in this embodiment) to properly locate the front cover 9 are provided on the front end face 8a of the lens barrel body 8.

The first lens frame 7 includes a cylindrical portion 7a to support the three lenses 3A to 3C and a flange portion 7b extended outside in the radius direction and continued to the outer peripheral surface of the cylindrical portion 7a. An upper portion of the flange portion 7 is recessed as an arc-shape recess corresponding to the shape of the front end face 8a of the lens barrel body 9. The flange portion 7b has three insertion holes 32, 33, 33 into which screw shaft portions of the attaching screws 23, 23 and 23 are inserted at the positions corresponding to the three screw holes 25, 29, 29 provided in the front end face 8a of the lens barrel body 8 upon assembly.

As shown in FIG. 5, the spherical convex portion 22 that is engaged with the spherical concave portion 21 is formed around the insertion holes 32 corresponding to the screw holes 25 formed in the side of the lens barrel body 8 indicating the inner surface of the flange portion 7b. The spherical convex portion 22 is formed as a spherical convex portion having a radius of curvature equal to or smaller than that of the spherical concave portion 21. An insertion hole 32 is formed to penetrate through the center of the spherical convex portion 22. In addition, seats 34, 34 on which the other ends of the coil springs 27, 27 are seated are formed around the two insertion holes 33, 33 at positions corresponding to the two screw holes 29, 29 of the lens barrel body 8.

Further, a flange portion 7b of the first lens frame 7 includes two bearing portions 36a, 36a located on the inner surface of the flange portion 7b to fixably support front end portions of two guide shafts 35A, 35B which may slidably support the second lens frame 11. The two bearing portions 36a, 36b are respectively located on both sides of the flange portion 7b in left and right directions. Further, the flange portion 7b includes a plurality of recesses 37 (four recesses 37 in this embodiment) for restricting the rotation of the first lens frame 7 provided at the outer edge of the flange portion 7b corresponding to the front cover 9 to properly locate the first lens frame 7. Four restricting pieces 44 provided on the front cover 9 are respectively engaged into the recesses 37.

The front cover 9 covers the circumferential edge of the front end face 8a that is formed of an annular member having a shape corresponding to the first lens frame 7 and the lens barrel body 8. The front cover 9 includes approximately at its substantially central portion an opening hole 38 through which light emitted from the subject travels. The front cover 9 includes a first undercut 41 provided at the outer edge of the front cover 9, with which the shaft-form protrusion 24 provided on the lens barrel body 8 is engaged, and two second undercuts 42, 42, with which the two supporting protrusions 28, 28 provided on the lens barrel body 8 are engaged in a condition under which the coil springs 27, 27 are attached to the supporting protrusions 28, 28. The first and second undercuts 41 and 42 are respectively opened to outside in the radius direction and with adequate clearance between the first and second undercuts 41, 42 and the shaft-form protrusions 24 and the coil springs 27. Accordingly, the front cover 9 may be allowed to move slightly in the radius direction to the lens barrel body 8 which intersects the direction of the optical axis L, and the attitudes of the front cover 9 may be changed within a predetermined range.

The front cover 9 includes concave portions 43, 43 provided at the inner edge of the front cover 9 with which the two bearing portions 36a, 36b provided on the first lens frame 7 are engaged. Further, the front cover 9 includes a plurality of restricting pieces 44 with protrusions (four restricting pieces 44 in the embodiment) provided at the front end face the front cover 9. The four restricting pieces 44 are provided at the positions corresponding to the four recesses 37 of the first lens frame 7. When the four restricting pieces 44 are engaged to the four recesses 37, the first lens frame 7 is adequately positioned on the front cover 9 such that the first lens frame 7 may change the attitude of the first lens frame 7 within a predetermined range. As shown in FIG. 1, it should be noted that the front cover 9 is provided with an expanded portion 9a to cover a protruded portion of the front end face 8a.

The lens barrel 1 having the above-mentioned configuration may be assembled easily as follows. The lens barrel body 8 includes lenses ranged from the second lens group 4 to the fourth lens group 6, all of which are assembled in advance. Accordingly, the second lens group 4 is held in the second lens group 11, which may be moved in the direction of the optical axis L by the two guide shafts 35A, 35B, faced to the front end face 8a of the lens barrel body 8. The lens barrel body 8 is fixed and supported to an assembly fixture (not shown) such that the front end face 8a of the lens barrel body 8 is turned upward. Accuracy in locating the lens barrel body 9 fixed and supported on the assembly fixture and perpendicularity between the front end face 8a of the lens barrel body 8 and the optical axis L may be controlled by the lens barrel body 8 to fall within a range of required accuracy or perpendicularity.

Subsequently, the coil springs 27, 27 are respectively attached to the two supporting protrusions 28, 28 provided on the front end face 8a of the lens barrel body 8. Lower ends of the coil springs 27, 27 are respectively seated on the seats 28a, 28a of the supporting protrusions 28, 28. The front cover 9 is faced in the direction to the front end face 8a, the pair of guide shafts 35A, 35B are inserted into the pair of insertion holes 43a, 43a, the shaft-form protrusion 24 is engaged into the first undercut 41 and the two supporting protrusions 28, 28 with the coil springs 27, 27 attached thereto are engaged into the two second undercuts 42, 42. The front cover 9 is adequately positioned to the front end face 8a of the lens barrel body 8 using the four locating pins 31.

The first lens frame 7 to which the first lens group 3 is held is faced in the direction of the front cover 9, and the spherical convex portion 22 is engaged into the spherical concave portion 21 formed on the end face of the shaft-form protrusion 24. The pair of bearing portions 36a, 36b is engaged with the pair of concave portions 43, 43 of the front cover 9 to allow the tip end portions of the pair of guide shafts 35A, 35B inserted into the insertion holes 43a, 43a to be held. The four restricting pieces 44, 44 provided on the front cover 9 are respectively engaged into the four recesses 37, 37 provided on the first lens frame 7.

The shaft portions of the attaching screws 23, 23, 23 are respectively inserted into the three insertion holes 32, 33, 33 provided on the flange portion 7 of the first lens frame 7 and screwed into the screw hole 25 of the shaft-form protrusion 24 and the screw holes 29, 29 of the supporting protrusions 28, 28. The first lens frame 7 is retained such that the attitudes of the first lens frame 7 may be changed by slightly fastening the attaching screws 23, 23, 23 screwed into the first supporting portion 16. The coil springs 27, 27 are compressed under a proper force in the two second supporting portions 17, 17 so that the first lens group 7 may be held resiliently under the spring force of the coil springs 27, 27.

When the optical axis of the first lens group 3 retained on the first lens frame 7 is parallel to the optical axis L of the lens system 2 formed of the lenses from the second lens group 4 to the fourth lens group 6 held on the lens barrel body 8, inclination of the first lens group 3 may not be adjusted in the subsequent steps. Accordingly, while maintaining the parallel state, the first lens frame 7 is attached and fixed to the lens barrel body 8 using an adhesive. The attaching screws 23 screwed into the first supporting portion 16 may be fastened, steadily and the first lens frame 7 may be fixed to the lens barrel body 8 by adhesive.

When, on the other hand, the optical axis of the first lens group 3 is not parallel to the optical axis L of the lens system 2, the inclination of the first lens group 3 may be adjusted through the first lens frame 7, which is described later. In this case, first, the attaching screw 23 of any of the two second supporting portions 17, 17 may be fastened or loosened adequately, and an angle of the inclination of the first lens group 3 and the change of that angle of the inclination may be examined. Subsequently, the attaching screw 23 screwed into the other second supporting portion 17 may be fastened or loosened adequately with a certain allowance for the change such that the optical axis of the first lens group 3 may become parallel to the optical axis L of the lens system 2.

Easy and rapid adjustment of the tilt of the first lens group 3 whose optical axis is tilted relative to the optical axis L of the lens system 2 may be realized by repeating once or an adequate times of adjustment with the attaching screws 23. More specifically, according to the embodiment of the present invention, the first supporting portion 16 of the three supporting portions 16, 17, 17 that support the first lens frame 7 on the lens barrel body 8 is formed such that the attitudes of the first supporting portion 16 may be changed, and the first supporting portion 16 serves as a reference portion for adjusting a tilt. Since the remaining two second supporting portions 17, 17 may be displaced in the direction of the optical axis L through the coil spring 27, the tilt of the first lens group 3 may be adjusted by adjusting the heights only in the remaining two second supporting portions 17, 17.

FIG. 7 shows a second embodiment of the above-described second supporting portions 17, 17. As shown in FIG. 7, second supporting portions 17, 17 shown as the second embodiment are formed such that the supporting protrusions 28, 28 provided on the front end face 8a of the lens barrel body 8 shown in the aforementioned embodiment are provided on the front cover 9. Seat portions 42a, 42a which enclose the lens barrel body 8 are respectively provided to the two second undercuts 42, 42 of the front surface cover 9. A cylindrical portion 48 is provided on each seat portion 42, and the screw shaft portion of the attaching screw 23 is inserted into the hole of the cylindrical portion 48. A screw hole into which the tip end of the screw shaft portion of the attaching screw 23 is screwed is provided on the front end face 8a. The remaining configuration is similar to that of the above-described embodiment.

In this embodiment, one end of each of the pair of coil springs 27, 27 are respectively seated on seat portions 42a, 42a provided on the second undercuts 42, 42 of the front cover 9 and the surface of the opposite side contacts the front end face 8a of the lens barrel body 8.

FIGS. 8 and 9 are perspective views showing a digital video camera 50 as a first embodiment of an imaging apparatus showing a specific example of an electronic instrument to which the lens barrel according to an embodiment of the present invention is applied. The digital video camera 50 may selectively record information on respective information storage media and reproduce the recorded information using two types of information storage media.

Of the two information storage media used in the digital video camera 50, the first information storage medium is a tape-form storage medium (e.g., tape cassette, etc.) in which a magnetic tape is accommodated in a cassette case, and the second information storage medium is a semiconductor storage medium (e.g., memory card, etc.) in which a CPU (central processing unit) and an LSI (large-scale integrated circuit) or the like is contained. The digital video camera 50 selectively uses the information storage media, converts an optical image into an electric signal using a CCD (charge-coupled device) indicating a specific example of an imaging device, records the image information on the tape-form storage medium, the semiconductor storage medium, and displays the image information on a display apparatus formed of a flat panel display such as a LED (light-emitting diode).

As shown in FIGS. 8 and 9, the digital video camera 50 includes an exterior case 51, indicating a specific example of the casing apparatus body, and a tape drive apparatus (mechanical deck, not shown) contained in the exterior case 51. The tape drive apparatus transports a magnetic tape of the tape cassette detachably loaded onto the tape drive apparatus as the first information storage medium to record (write) or reproduce (read) information on and from the magnetic tape, a control circuit (not shown) to drive and control the tape drive apparatus, the lens apparatus 1 to pick up a subject image as light and introduce the light into the CCD, a display apparatus 52 rotatably attached to the exterior case 51, and the like.

The exterior case 51 is formed of an approximately cylindrical hollow case having an axis positioned in the horizontal direction. The above-described lens apparatus 1 has an approximately similar thickness to that of the exterior case 51 that is disposed on the front portion of the exterior case 51. The lens apparatus 1 is attached to the exterior case 51 such that the optical axis of the lens system is directed in the horizontal direction. Within the exterior case 51, the CCD is attached to the rear portion of the lens apparatus 1. A viewfinder apparatus 53 is located behind the lens apparatus 1.

The upper portion of exterior case 51 includes an opening portion to expose an accessory shoe to which an accessory, such as a video light or a microphone, are detachably attached. The accessory shoe is disposed on the upper portion of the lens apparatus 1 that is detachably covered with a shoe cap 54 to open and close the opening portion. Further, a stereo type microphone 55 is accommodated in the lower portion of the front surface of the exterior case 51. A light-emitting unit 56 of a flash device is disposed on the upper portion of the front surface of the lens apparatus 1.

The display apparatus 52 is attached to one side of the exterior case 51 such that the attitudes of the display apparatus 52 may be changed. The display apparatus 52 includes a flat panel display 57 formed of a flat plate LCD (liquid-crystal display), a panel case 58 in which the flat panel display 57 is accommodated and a panel supporting portion 59 for supporting the panel case 58 such that the attitudes of the panel case 58 may be changed. The panel case 58 is formed of a flat case having an approximately rectangular parallelepiped, and an opening window 61 to expose the display surface of the flat panel display 57 is provided on the surface facing one side of the exterior case 51. The opening window 61 is formed of a rectangular through-hole extended in a longitudinal direction, and four sides surrounding the opening window 61 form a rectangular frame portion 58a. The frame portion 58a of the panel case 58 at the side opposite to the panel supporting portion 59 includes a plurality of operation buttons 62 to operate the flat panel display 57.

The panel supporting portion 59 includes a horizontal rotating portion which may rotate the panel case 58 around the vertical axis approximately 90 degrees in the horizontal direction as a central position of rotation and a back-and-forth rotating portion which can rotate the panel case 58 around the horizontal axis approximately 180 degrees in a back-and-forth direction and also can rotate the panel case 58 approximately 90 degrees in upper-and-lower direction, thereby enabling the panel case 58 to rotate approximately 270 degrees in total. Accordingly, the attitudes of the display apparatus 52 may be changed such that the panel case 58 may rotate 90 degrees in the horizontal direction to allow the flat panel display 57 to face a portion of the side surface of the exterior case 51, as shown in FIG. 9, to have the flat panel display 57 accommodated in the side of the exterior case 51, to rotate the panel case 58 in 180 degrees from the attitude shown in FIG. 9, to allow the flat panel display 57 to face the other portion of the side surface of the exterior case 51, to further rotate the flat panel display 57 in 90 degrees in a backward direction from the attitude where the flat panel display 57 faces the portion of the side surface of the exterior case 51 to allow the flat panel display 57 to face downward, and to locate the flat panel display 57 in any of the attitudes between the above-described positions.

A recessed accommodation portion 63 is provided in the side of the exterior case 51 for accommodating a portion of the flat panel display 57 of the display apparatus 52 to open and close. As shown in FIG. 9, the recessed accommodation portion 63 is formed such that the recessed accommodation portion may agree with the outlined shape of the panel case 58. The recessed accommodation portion 63 includes a storage medium insertion slot 64 of the storage medium accommodation portion at approximately a central portion, and a plurality of holes 66 are provided close to the external peripheral apparatus 64, and the external peripheral apparatus forms a plurality of holes 66 to produce sounds from a built-in speaker apparatus (not shown).

As shown in FIG. 8, the exterior case 51 includes a grip portion 67 provided on the side opposite to the display apparatus 52 to allow an user to grip the exterior case 51. The grip portion 67 may also serve as a cover member to cover the mechanical deck (not shown) accommodated in the grip portion 67. When the upper portion of the grip portion 67 is opened to outside, the cassette insertion slot of the built-in mechanical deck is exposed such that the tape cassette is inserted into or ejected from the mechanical deck. In order to open the grip portion 67, the grip portion 67 may be released from being locked by sliding a lock releasing button 68 backward, which is provided on the upper portion of the grip portion 67. After releasing the grip portion 67 from the locked state, the grip portion 67 may be opened manually in the lateral direction (or the grip portion 67 may be opened automatically). On the other hand, in order to close the grip portion 67, the grip portion 67 in the released state may be pressed inwardly, pushed to a predetermined position, and thus the grip portion 67 may be closed.

The grip portion 67 includes a power switch 71 provided at the upper rear portion of the grip portion 67 serving as a mode selection switch, a shutter release button 72 to image still images and a zoom button 73 to allow images to be continuously zoomed in (telephoto-mode images) or to be zoomed out (wide-angle mode images) within a predetermined range. The power switch 71 includes a function of switching ON and OFF with a power switch when rotated and a function of switching the mode to repeat a plurality of function modes when rotated in a state in which the power switch is still turned on. A recording button 74 for enabling the digital video camera 50 to image moving images is located under this power switch 71.

Further, a handbelt 75 is attached to the lower portion of the grip portion 67 to extend in the horizontal direction, and a handpad 76 is attached to the handbelt 75. The handbelt 75 and the handpad 76 may support a hand of an user who grips the grip portion 67 of the exterior case 51 to thus prevent the digital video camera 50 from inadvertently being dropped. Further, as shown in FIG. 9, the exterior case 1 includes a battery compartment portion 77 provided at the back side of the battery compartment portion 77 to which a battery apparatus, such as a portable power supply, is detachably attached. The battery compartment 77 is formed as a concave portion formed continuously from the central portion to the lower surface. The viewfinder apparatus 53 formed as a semicircular dome is disposed on the upper portion of the battery compartment portion 77.

When the digital video camera 50 having the above-mentioned configuration employs the above-described lens barrel 1, an imaging apparatus that can record not only moving images but also record still images may be provided. In addition, a digital video camera that can record a subject with clarity may be provided.

As described above, in the lens barrel according to an embodiment of the present invention, of three or more supporting portions capable of supporting the lens holding member on the lens barrel body to change the attitudes of the lens holding member, one first supporting portion includes the spherical convex portion combined with the spherical concave portion, and the two remaining second supporting portions are configured such that the distance therebetween may be adjusted. Therefore, easy and accurate adjustment of a tilt of the lens supported to the lens holding member may be realized using the first supporting portion, the number of steps for adjusting tilt of the lens in this type of lens barrel may be reduced, and hence production efficiency of the lens barrel and the imaging apparatus may be increased. It should be noted that, while the second supporting portions 17 are provided at two portions and the supporting portions 16, 17, 17 are provided on the three portions as a whole in the above-described embodiments, the present invention is not limited thereto, and it is needless to say that the second supporting portions 17 may be provided at three or more portions.

The present invention is not limited to the embodiments described hereinbefore and shown in the drawings, and it can be variously modified and embodied without departing from the gist thereof. For example, while the example in which the present invention is applied to the digital video camera has so far been described as a specific example of the imaging apparatus in the above-described embodiments, it is needless to say that the present invention can be applied not only to analog video cameras but also to electronic still cameras, surveillance cameras, personal computers, mobile phones and various kinds of imaging apparatus.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A lens barrel comprising:
a lens barrel body for fixably and/or movably supporting a plurality of lens barrel lenses, the plurality of lens barrel lenses extending radially from and being aligned along a lens barrel optical axis within the lens barrel body;
lens holding member for holding at least one holding member lens, the at least one holding member lens extending radially from and being aligned along a holding member lens optical axis; and
an alignment device for interconnecting the lens barrel body and the lens holding member and for aligning the lens holding member supported on the lens barrel body, wherein
the alignment device includes at least three supporting portions to support the lens holding member on the lens barrel body, the at least three supporting portions disposed radially apart from the lens barrel optical axis and angularly apart from one another,
at least one of the three supporting portions includes a spherical convex portion provided on one of the lens holding members and the lens barrel body and a spherical concave portion provided on the other of the lens holding members and the lens barrel body that is engaged with the spherical convex portion, and
at least one of the remaining supporting portions of the three except the one supporting portion can adjust a distance between the lens holding and the lens barrel body such that the lens holding member can be tilted relative to the lens barrel so that the holding member optical axis can be adjusted to align coexistently with the lens barrel optical axis.

2. A lens barrel according to claim 1, wherein
at least the three supporting portions are provided with attaching screws to connect the lens holding members and the lens barrel,
the attaching screw includes a screw shaft portion that penetrates an insertion hole formed in one of the lens holding members and the lens barrel body, and
a tip portion of the screw shaft portion is screwed into a screw hole formed in the other of the lens holding members and the lens barrel body.

3. A lens barrel according to claim 1, wherein
at least the remaining supporting portions of the three except the one supporting portion include elastic members such that the lens holding members are biased in a direction departed from the lens barrel body.

4. A lens barrel according to claim 3, wherein
a cover member is provided to interpose between the lens barrel body and the lens holding members, and
the cover member includes a seat on which one end of the elastic member is seated.

5. A method of adjusting a tilt of a lens of a lens barrel comprising the steps of:
spherically supporting one portion of a lens holding member for holding at least one holding member lens on a lens barrel body that fixably and/or movably supports a plurality of lens barrel lenses extending along a lens barrel optical axis, the at least one holding member lens extending radially from a holding member lens optical axis; and
supporting two or more portions of the lens holding member onto the lens barrel body except the spherically supported one portion of the lens holding member such that the heights of two or more portions of the lens holding member can be adjusted relative to the lens barrel body and wherein
a tilt of the at least one holding member lens is adjusted corresponding to the plurality of lens barrel lenses by adjusting the heights of the two or more portions of the supporting portions that are height adjustable so that the at least one holding member lens can be moved relative to the lens barrel body so that the holding member optical axis can be adjusted to align coexistently with the lens barrel optical axis.

6. An imaging apparatus comprising:
a lens barrel including a lens barrel body for fixably and/or movably supporting a plurality of lens barrel lenses, a lens holding member for holding at least one of the plurality of holding member lens, and an alignment device for interconnecting the lens barrel body and the lens holding member and for aligning the lens holding member supported on the lens barrel body, the plurality of lens barrel lenses extending radially from and being aligned along a lens barrel optical axis within the lens barrel body, the at least one holding member lens extending radially from and being aligned along a holding member lens optical axis, wherein
the alignment device includes at least three supporting portions to support the lens holding member on the lens barrel body, the at least three supporting portions disposed radially apart from the lens barrel optical axis and angularly apart from one another,
at least one of the three supporting portions includes a spherical convex portion provided on one of the lens holding members and the lens barrel body and a spherical concave portion provided on the other of the lens holding members and the lens barrel body that is engaged with the spherical convex portion, and
at least one of the remaining supporting portions of the three except the one supporting portion can adjust a distance between the lens holding member and the lens barrel body such that the lens holding member can be tilted relative to the lens barrel so that the holding member optical axis can be adjusted to align coexistently with the lens barrel optical axis.

* * * * *